US009215610B2

(12) United States Patent
Mach et al.

(10) Patent No.: US 9,215,610 B2
(45) Date of Patent: Dec. 15, 2015

(54) PSEUDO-RANDOM CELL RESELECTION

(75) Inventors: Tomasz Mach, Hampshire (GB); Marko Akselin, Oulu (FI)

(73) Assignee: Nokia Technologies Oy, Espoo (FI)

( * ) Notice: Subject to any disclaimer, the term of this patent is extended or adjusted under 35 U.S.C. 154(b) by 373 days.

(21) Appl. No.: 13/127,693

(22) PCT Filed: Nov. 4, 2008

(86) PCT No.: PCT/EP2008/064960
§ 371 (c)(1),
(2), (4) Date: Sep. 8, 2011

(87) PCT Pub. No.: WO2010/051835
PCT Pub. Date: May 14, 2010

(65) Prior Publication Data
US 2012/0120802 A1    May 17, 2012

(51) Int. Cl.
*H04W 28/08* (2009.01)
*H04W 28/02* (2009.01)
*H04W 48/06* (2009.01)
*H04W 60/04* (2009.01)

(52) U.S. Cl.
CPC .............. *H04W 28/02* (2013.01); *H04W 48/06* (2013.01); *H04W 60/04* (2013.01)

(58) Field of Classification Search
None
See application file for complete search history.

(56) References Cited

U.S. PATENT DOCUMENTS

| 8,996,027 | B2 * | 3/2015 | Lecompte | 455/456.1 |
| 2003/0093167 | A1 * | 5/2003 | Sim | 700/90 |
| 2006/0072516 | A1 * | 4/2006 | Jeong et al. | 370/335 |
| 2010/0161797 | A1 * | 6/2010 | Nandagopal et al. | 709/225 |
| 2010/0240356 | A1 * | 9/2010 | Lee et al. | 455/422.1 |

FOREIGN PATENT DOCUMENTS

| EP | 1679851 A1 | 7/2006 |
| WO | 97/33448 A2 | 9/1997 |
| WO | 01/52589 A1 | 7/2001 |
| WO | 2008/024055 A2 | 2/2008 |

* cited by examiner

*Primary Examiner* — Huy D Vu
*Assistant Examiner* — Teisha D Hall
(74) *Attorney, Agent, or Firm* — Mintz Levin Cohn Ferris Glovsky and Popeo, P.C.

(57) ABSTRACT

An apparatus comprising a processor configured to initiate re-selection and/or re-registration procedures and, responsive to a first parameter, delay initiation of re-selection and/or re-registration procedures for a random and/or pseudo-random delay value.

21 Claims, 4 Drawing Sheets

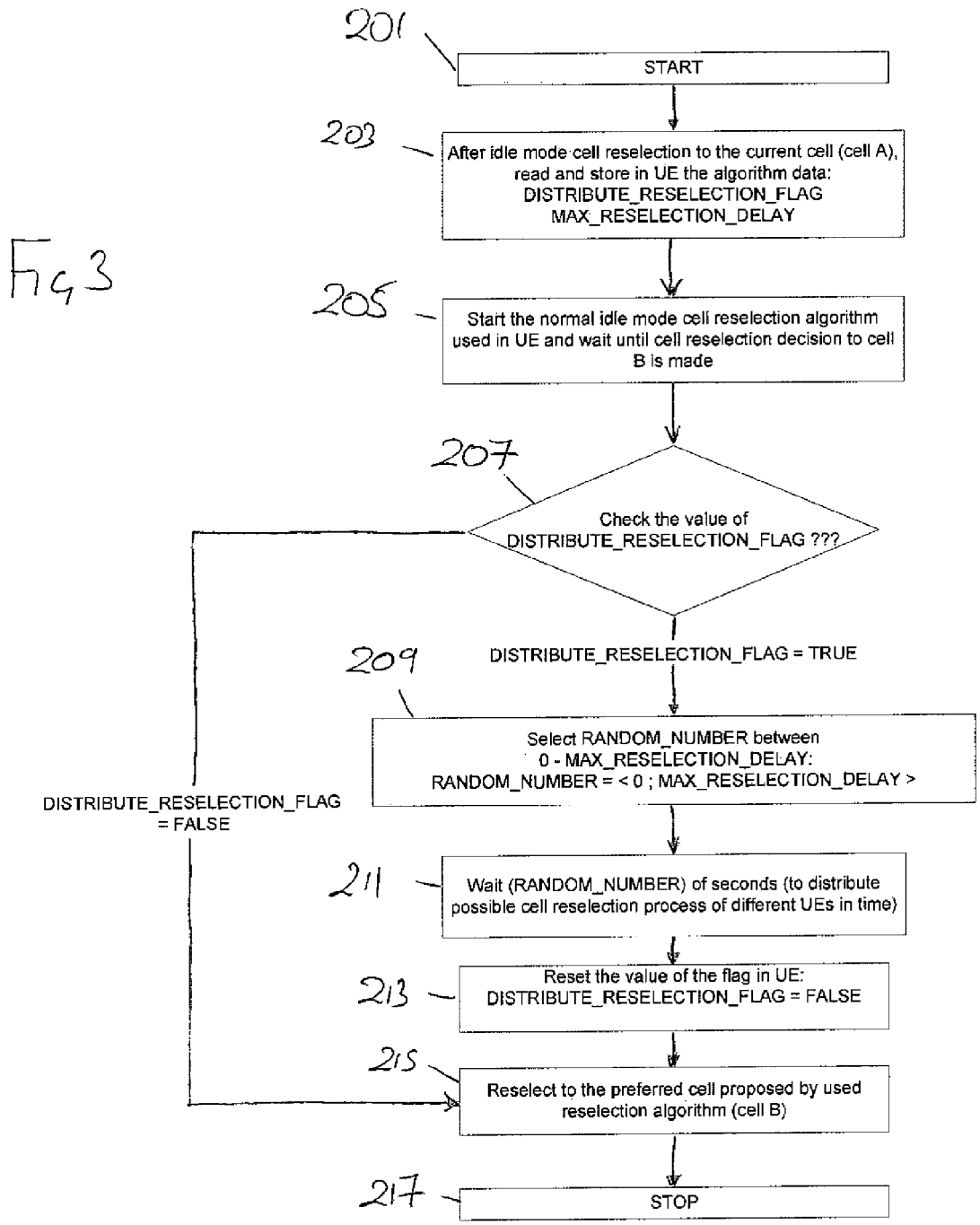

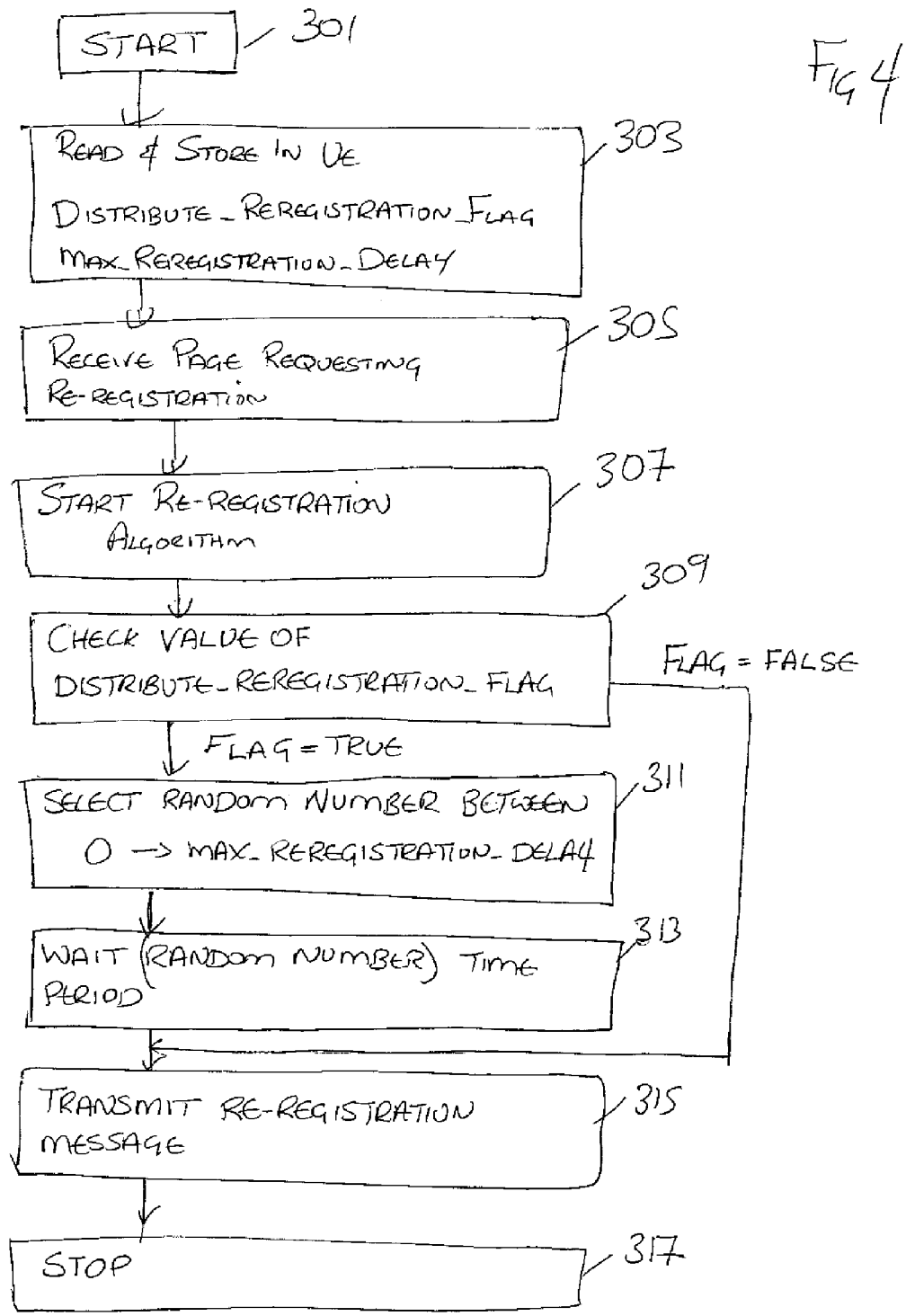

PSEUDO-RANDOM CELL RESELECTION

RELATED APPLICATION

This application was originally filed as PCT Application No. PCT /EP2008/064960 filed Nov. 4, 2008.

FIELD OF THE INVENTION

The present invention relates to an apparatus and in particular but not exclusively for enabling efficient spectral and signalling traffic load balancing for a communication system. The present invention also relates to an associated system, computer program and entities.

DESCRIPTION OF RELATED ART

A communication device can be understood as a device provided with appropriate communication and control capabilities for enabling use thereof for communication with others parties. The communication may comprise, for example, communication of voice, electronic mail (email), text messages, data, multimedia and so on. A communication device typically enables a user of the device to receive and transmit communication via a communication system and can thus be used for accessing various service applications.

A communication system is a facility which facilitates the communication between two or more entities such as the communication devices, network entities and other nodes. A communication system may be provided by one or more interconnected networks. One or more gateway nodes may be provided for interconnecting various networks of the system. For example, a gateway node is typically provided between an access network and other communication networks, for example a core network and/or a data network.

An appropriate access system allows the communication device to access to the wider communication system. An access to the wider communications system may be provided by means of a fixed line or wireless communication interface, or a combination of these. Communication systems providing wireless access typically enable at least some mobility for the users thereof. Examples of these include wireless communications systems where the access is provided by means of an arrangement of cellular access networks. Other examples of wireless access technologies include different wireless local area networks (WLANs) and satellite based communication systems.

A wireless access system typically operates in accordance with a wireless standard and/or with a set of specifications which set out what the various elements of the system are permitted to do and how that should be achieved. For example, the standard or specification may define if the user, or more precisely user equipment, is provided with a circuit switched bearer or a packet switched bearer, or both. Communication protocols and/or parameters which should be used for the connection are also typically defined. For example, the manner in which communication should be implemented between the user equipment and the elements of the networks and their functions and responsibilities are typically defined by a predefined communication protocol.

In the cellular systems a network entity in the form of a base station provides a node for communication with mobile devices in one or more cells or sectors. It is noted that in certain systems a base station is called 'Node B'. Typically the operation of a base station apparatus and other apparatus of an access system required for the communication is controlled by a particular control entity. The control entity is typically interconnected with other control entities of the particular communication network. Examples of cellular access systems include Universal Terrestrial Radio Access Networks (UTRAN) and GSM (Global System for Mobile) EDGE (Enhanced Data for GSM Evolution) Radio Access Networks (GERAN).

A non-limiting example of another type of access architectures is a concept known as the Evolved Universal Terrestrial Radio Access (E-UTRA). This is also known as Long term Evolution UTRA or LTE. An Evolved Universal Terrestrial Radio Access Network (E-UTRAN) consists of E-UTRAN Node Bs (eNBs) which are configured to provide base station and control functionalities of the radio access network. The eNBs may provide E-UTRA features such as user plane radio link control/medium access control/physical layer protocol (RLC/MAC/PHY) and control plane radio resource control (RRC) protocol terminations towards the mobile devices.

In systems providing packet switched connections the access networks are connected to a packet switched core network via appropriate gateways. For example, the eNBs are connected to a packet data core network via an E-UTRAN access gateway (aGW)—these gateways are also known as serving gateways (sGW) and mobility management entities (MME).

Conventional cellular radio communication systems such as those described above may experience extreme signalling overload situations with regards to conventional cell reselection and cell re-registration algorithms. This may occur when the cell user equipment or apparatus is camped on a particular cell and in an idle mode, in other words where there is no active connection with the mobile network.

These signalling overload situations may occur with conventional reselection mechanisms as the conventional reselection mechanisms fail to take into account the scale of the reselection process between cells. Furthermore the problem may occur frequently in the reselection between cells within so-called "hot spot" areas. These "hot spot" areas are those which have large variances in user densities, for example where cells are typically small and are required to handle large numbers of simultaneous movements of user equipment in and out of the cell. A real world example of this type of cell is a cell located in or near a train/bus station when a train/bus enters or leaves the station there is a large and sudden fluctuation of users in the cell but not necessarily actively connecting to the mobile network.

In order to handle such large numbers of users at the same time operators of mobile networks may provide additional network capacity by adding cells at the same location. These are typically known as co-located cells. These additional cells may handle the increased user traffic. Furthermore these additional co-located cells may also provide a higher quality of service for network users in the "hot spot" area by providing access nodes such as node B or enhanced node B network elements with different radio access technologies (RAT) than the existing element to provide higher data rates. For example, an operator may introduce a high speed packet access (HSPA) radio access technology which is co-located with a general packet radio system access network (GPRS AN). These additional co-located cells may therefore be preferred for cell reselection.

The main objective of the conventional cell reselection mechanism is to select the best quality cell based on a predefined criteria (the predefined criteria may be ranking or priority based dependent on the protocols used in the underlying radio access network technology. For example ranking based reselection is used in Universal Mobile Terrestrial System (UMTS) network standards and priority based reselection in 3$^{rd}$ Generation Partnership Project Long Term Evolution (3GPP LTE) standard radio access networks.

Where the additional "better quality" cells are available in the hot spot area, they are often preferred in idle mode cell reselection algorithms used in the user equipment. The network may therefore add an additional offset to the ranking of a particular cell in order to influence which cell is the preferred cell in a ranking based reselection algorithm or give a higher priority to the cell in a priority based reselection system.

Furthermore, the predefined criteria which is typically provided by the network in a system information block provides the apparatus with decision selection to reselect to the boosted cell and trigger bidirectional data communication with the network required for signalling purposes to inform the network about the location changes of the user equipment, for example providing cell update information, location area update procedure information, and registration area update information.

Where the reselected cell is part of a separate radio access technology the cell update signalling procedure will happen in the newly selected radio access technology network.

In order to perform this signalling data transmission some network resources are required for a short period of time (typically few seconds). However where there is a large number of user equipment simultaneously moving into the hot spot area as indicated above there is a high risk of network load congestion caused by the signalling traffic generated by location update procedures from different mobiles during the short period of time. This network load congestion issue may instigate network instability issues.

Furthermore, during re-registration a similar problem may occur. Re-registration algorithms also use a small amount of network resources for a short amount of time in communicating re-registration tokens with the mobile network to prevent the network reserving resources which may be released. For example, However where there are a large number of user equipment camped, in other words in idle mode within the service region of a cell, and the cell issues a page to all of the user equipment requesting re-registration of user equipment, the resources used by the user equipment in re-registering may produce a similar short term load congestion on the network and cause similar network instability issues.

SUMMARY OF INVENTION

Embodiments of the invention aim to at least partially mitigate these problems.

There is provided according to a first aspect of the present invention an apparatus comprising: a processor configured to initiate re-selection and/or re-registration procedures; and responsive to a first parameter delay initiation of re-selection and/or re-registration procedures for a random and/or pseudo-random delay value.

Therefore in embodiments of the invention it may be possible to distribute or flatten any network peaks of signalling traffic in paging responses such as re-selection or re-registration procedures as each apparatus is delayed by a delay value. Therefore providing the delay has a high degree of entropy, in other words has a random or pseudo-random distribution there is unlikely to be large peaks but a generally random or pseudo-random distribution of traffic usage.

The apparatus may further comprise a memory configured to store the first parameter.

The first parameter may comprise a distribution flag, wherein the processor is preferably configured to delay initiation of re-selection and/or re-registration procedures when the flag is true.

The first parameter may comprise a maximum delay value, wherein the random and/or pseudo-random delay value is preferably less than or equal to the maximum delay value.

The processor is preferably further configured to generate the random and/or pseudo-random delay value.

The apparatus may further comprise a communications interface configured to send a message relating to re-selection and/or re-registration procedures.

The message is preferably at least one of: a re-registration message; a reselection message; a cell update message; and a location update message.

The apparatus is preferably configured to receive the first parameter from a further apparatus.

The further apparatus may comprise an access node comprising at least one of: a node B; an enhanced node B; a base station; a local node B; and a wireless communication access point.

The apparatus may comprise a user equipment.

According to a second aspect of the present invention there is provided a method comprising: initiating re-selection and/or re-registration procedures; and delaying, responsive to a first parameter, initiating re-selection and/or re-registration procedures for a random and/or pseudo-random delay value.

The method may further comprise storing the first parameter.

The first parameter may comprise a distribution flag, and wherein responsive to the flag being true may delay initiation of re-selection and/or re-registration procedures.

The first parameter may comprise a maximum delay value, and may delay initiation of re-selection and/or re-registration procedures for the random and/or pseudo-random delay value less than or equal to the maximum delay value.

The method may further comprise generating the random and/or pseudo-random delay value.

The method may further comprise sending a message relating to re-selection and/or re-registration procedures, The message is preferably at least one of: a re-registration message; a reselection message; a cell update message; and a location update message.

The method may further comprise receiving the first parameter from a further apparatus.

According to a third aspect of the present invention there is provided a computer-readable medium encoded with instructions that, when executed by a computer, perform: initiating re-selection and/or re-registration procedures; and delaying, responsive to a first parameter, initiating re-selection and/or re-registration procedures for a random and/or pseudo-random delay value.

The computer-readable medium may further perform storing the first parameter.

The first parameter may comprise a distribution flag, and wherein responsive to the flag being true may delay initiation of re-selection and/or re-registration procedures.

The first parameter may comprise a maximum delay value, and delay initiation of re-selection and/or re-registration procedures for the random and/or pseudo-random delay value less than or equal to the maximum delay value.

The computer-readable medium may further perform generating the random and/or pseudo-random delay value.

The computer-readable medium may further perform sending a message relating to re-selection and/or re-registration procedures.

According to a fourth aspect of the invention there is provided an apparatus comprising: means for initiating re-selection and/or re-registration procedures; and means responsive to a first parameter for delaying initiation of re-selection and/or re-registration procedures by a random and/or pseudo-random delay value.

BRIEF DESCRIPTION OF FIGURES

For a better understanding of the present invention and as to how the same may be carried into effect, reference will now be made by way of example only to the accompanying drawings in which:

FIG. 3 shows a flow diagram illustrating an embodiment of the invention; and

FIG. 4 shows a further flow diagram illustrating a further embodiment of the invention.

DETAILED DESCRIPTION OF PREFERRED EMBODIMENTS OF THE INVENTION

Figure 1:
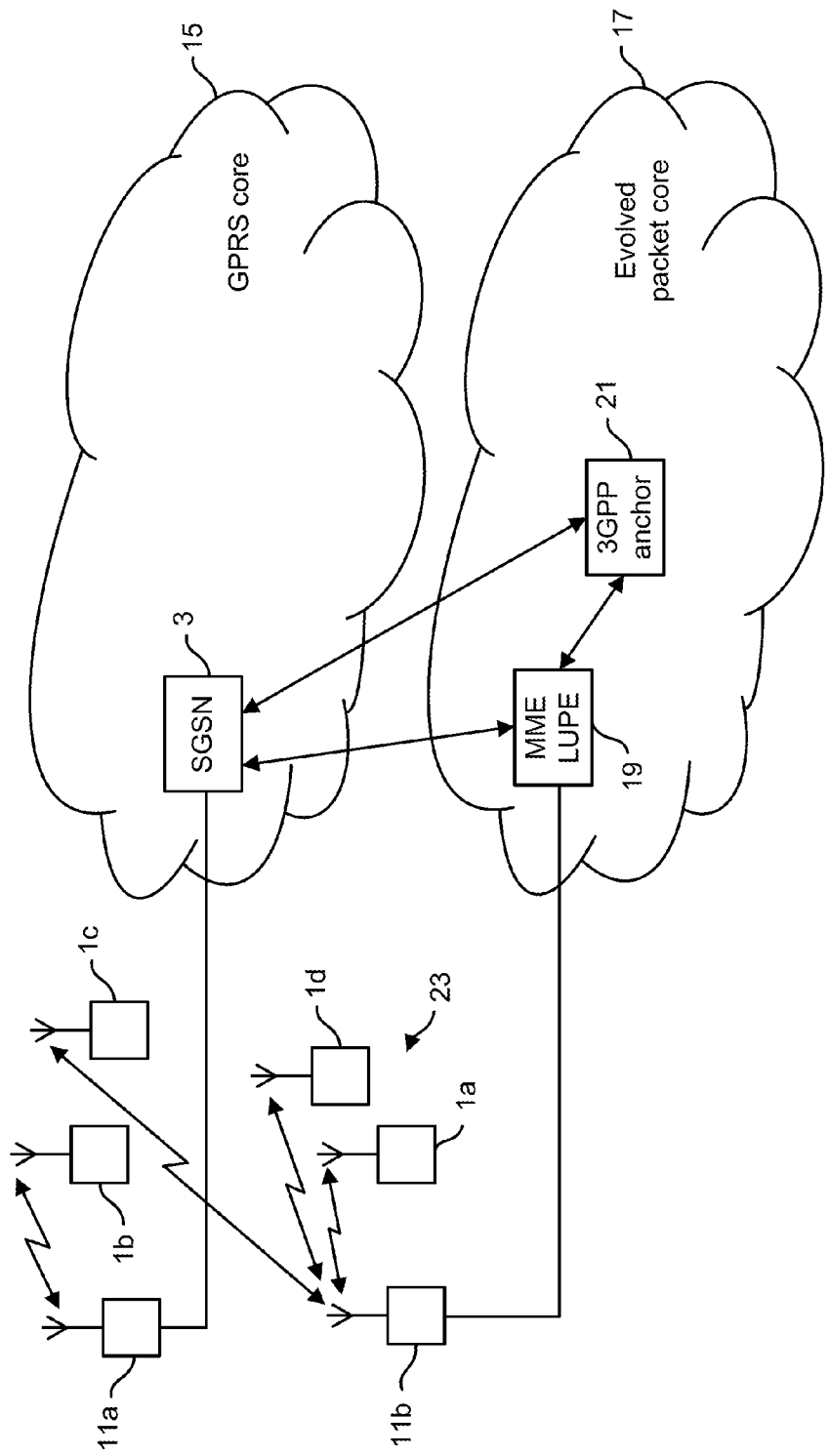
FIG. 1 shows schematically a wireless communications system within which embodiments of the invention may be implemented.

With respect to FIG. 1, a wireless communication system within which embodiments of the invention may be implemented is shown. FIG. 1 shows a first node B (NB) 11a which is arranged to communicate with a user device or apparatus 1b. The NB is furthermore configured to be connected to a serving GPRS support node (SGSN) 3. The serving GPRS support node (SGSN) is a network element responsible for the delivery of packet data to and from the mobile stations within a geographical service area via a series of node Bs or enhanced node Bs. The SGSN 3 tasks include packet routing and transfer, mobility management, logical link management and authentication and charging functions. The SGSN 3 is a component of the general packet radio services (GPRS) core 15.

The second node B (NB) 11b is shown co-located, in other words located nearby or at the same location as the first NB 11a. In other embodiments of the invention the two node B apparatus may cover a partially or completely overlapping field of service. Furthermore although the examples shown above and described hereafter indicate only two cells using two different radio access network technologies, it would be appreciated that the examples described hereafter may be applied to any number of different cells with any number of different radio access technologies.

In the examples described hereafter the cell served by the second node B 11b is considered to have been added on top of the first node B 11a as a neighbour cell to increase the network capacity and provide higher quality of service in a specific "hot spot".

As the cell served by the second node B 11b provides a higher quality of service for user equipment in terms of higher data transmissions speed, etc. it is defined as a preferred reselection cell in the network reselection algorithm. In other words, it is provided with a higher ranking or higher priority.

However, in different embodiments of the invention and as indicated above, further cells served by different node Bs may have higher or lower priorities or ranking than the second node B.

The second node B (NB) 11b is shown operating within a EUTRA network and thus communicates to the mobility management entity (MME) 19. The mobility management entity 19 is a control plane entity which manages the attachment to the network, the authentication of the user equipment 1c, 1d, 1e (which wirelessly communicate with the second area node B 11b), and interfaces the radio access network for the creation of relevant radio bearers. The MME 19 is shown connected to a 3GPP anchor 21 which according to the network within which embodiments of the invention operate in may be a serving gateway (S-GW) or a packet data network gateway (P-GW).

The mobility management entity 19 and 3GPP anchor 21 are components of the evolved packet core 17. Furthermore the mobility management entity 19 and the 3GPP anchor 21 can further communicate with the SGSN 3 of the GPRS core 15.

As shown with respect to FIG. 1 and the second local area node B 11b, some embodiments of this invention are related to the long term evolution (LTE) version of 3GPP. In the proposed LTE structure the Physical layer is based on SC FDMA (single carrier frequency division multiple access) for the Uplink and OFDMA (orthogonal frequency division multiple access) for the Downlink. However it would be understood by the person skilled in the art that other access technologies and methods may still employ embodiments of the invention.

Figure 2:
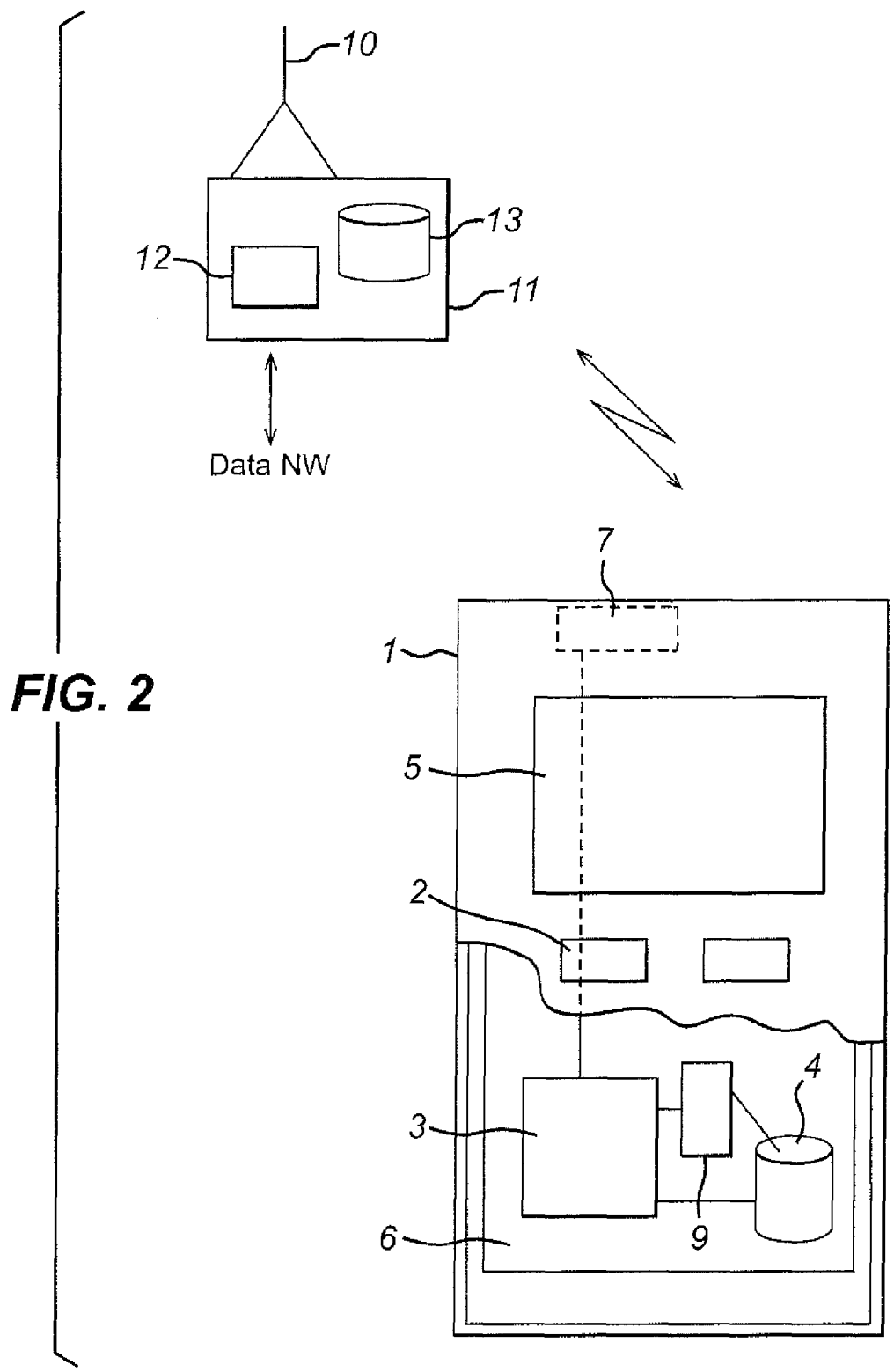
FIG. 2 shows schematically elements of the wireless communications system as shown in FIG. 1 in further detail.

Embodiments of the invention may be implemented as a part of a long term evolution (LTE) radio system. Therefore the non-limiting example of FIG. 2 shows in further detail the second node B 11b and an user equipment configured to be in wireless communication with the second node B 11b. This system shown in FIG. 2 provides an evolved radio access system that is connected to a packet data system. Such an access system may be provided, for example, based on architecture that is known from the Evolved Universal Terrestrial Radio Access (E-UTRA) and based on use of the Evolved Universal Terrestrial Radio Access Networks (E-UTRAN) Node Bs (NB) 11b. The Evolved Universal Terrestrial Radio Access Network (E-UTRAN) consists of a Node B (NB) 11b which is configured to provide base station and control functionalities. For example, the NB node can provide independently radio access network features such as user plane radio link control/medium access control/physical layer protocol (RLC/MAC/PHY) and control plane radio resource control (RRC) protocol terminations towards the user equipment.

Although the embodiments described below describe a system incorporating various different technology node Bs, such as GPRS and E-UTRAN, other embodiments of the invention may be implemented where the node Bs all use the same or slight variants of the same access technology but implemented by different operators.

It is noted that FIG. 2 shows this architecture only to give an example of a possible communication system where the embodiments described below may be provided and that other arrangements and architectures are also possible. For example, the user equipment may communicate with a different access system, such as GPRS via a GPRS access device, for example the first NB 11a.

The E-UTRA NB 11b has an antenna 10 for communicating with the user equipment 1 via wireless link. The E-UTRA NB 11b has a data processing entity for carrying out various processes. Additionally a memory 13 is provided which stores information which is used by the E-UTRA NB 11b.

In embodiments of the invention, an NB may also communicate with other NB(s) nearby over the air or wirelessly, regardless of whether they belong to the same network or a different operator's network.

The user equipment 1 or apparatus can be used for various tasks such as making and receiving phone calls, for receiving and sending data from and to a data network and for experiencing, for example, multimedia or other content. For example, a user device may access data applications provided via a data network. For example, various applications may be offered in a data network that is based on the Internet Protocol (IP) or any other appropriate protocol. An appropriate user device or apparatus may be provided by any device capable of sending and receiving radio signals. Non-limiting examples include a mobile station (MS), a portable computer provided with a wireless interface card or other wireless interface facility, personal data assistant (PDA) provided with wireless communication capabilities, or any combinations of these or the like.

The mobile device may communicate via an appropriate radio interface arrangement of the mobile device. The interface arrangement may be provided for example by means of a radio part 7 and associated antenna arrangement. The antenna arrangement may be arranged internally or externally to the mobile device.

A mobile device is typically provided with at least one data processing entity 3 and at least one memory 4 for use in tasks it is designed to perform. The data processing and storage entities can be provided on an appropriate circuit board and/or in chipsets. This feature is denoted by reference 6.

FIG. 2 shows further a modulator component 9 connected to the other elements. It is noted that the modulator functions may be arranged to be provided by the data processing entity 3 instead of a separate component.

The user may control the operation of the user equipment by means of a suitable user interface such as key pad 2, voice commands, touch sensitive screen or pad, combinations thereof or the like. A display 5, a speaker and a microphone are also typically provided. Furthermore, a user equipment may comprise appropriate connectors (either wired or wireless) to other devices and/or for connecting external accessories, for example hands-free equipment, thereto.

In the proposed LTE structure, the physical layer details are as follows. The generic radio frame for FDD (frequency division duplex) and TDD (time division duplex) has a duration of 10 ms and consists of 20 slots with a slot duration of 0.5 ms. Two adjacent slots form one sub-frame of length 1 ms. A resource block spans either 12 sub-carriers with a sub-carrier bandwidth of 15 kHz or 24 sub-carriers with a sub-carrier bandwidth of 7.5 kHz each over a slot duration of 0.5 ms.

The physical channels defined in the downlink are the Physical Downlink Shared Channel (PDSCH), the Physical Downlink Control Channel (PDCCH) and the Common Control Physical Channel (CCPCH). The physical channels defined in the uplink are the Physical Uplink Shared Channel (PUSCH) and the Physical Uplink Control Channel (PUCCH).

The channel coding scheme for transport blocks in LTE is Turbo Coding. Trellis termination is used for the turbo coding. Each radio frame is long and consists of 20 slots of length 0.5 ms, numbered from 0 to 19.

Some embodiments of the invention are related to the control channel structure in the context of the FDD mode of 3GPP. However, it should be appreciated that embodiments of the invention may also be applied to the TDD mode as well, since the concept of creating control channels for the TDD mode uses similar principles.

As discussed, the general control channel structure is such that there will be a division between control and data, such that these are using time domain multiplexing (meaning that a number of OFDM symbols in each TTI (transmission time interval) will carry the control channels for a number of UE (PDCCH), and a set of OFDM symbols will carry the shared channel for a number of users (PDSCH)).

With respect to FIGS. 3 and 4 we describe how node B elements 11 and user equipment provide a more stable network by distributing idle mode cell reselection and cell re-registration processes to different user equipment which causes the reselection or re-registration procedure to be delayed in co-located neighbour cell by a randomly selected period of time in the user equipment or apparatus.

As a result the reselection process and/or re-registration process may be distributed in time between different user equipment and therefore different users. This would reduce the average cell signalling load and therefore increase the overall quality of service in the network. In other words, to delay the reselection and re-registration procedure by a random amount to prevent the simultaneous mass reselection and re-registration of user equipment that can happen, for example when a train enters a station or when the node B pages all of the user equipment to register.

With regards to the cell reselection implementation as shown in the algorithm shown in FIG. 3, additional network parameter data is required by any user equipment to operate the improved algorithms. This data may be passed to the user equipment implementing the improved algorithm by the network.

The implementation of the improved algorithm in a first embodiment of the invention uses two additional pieces of network parameter data.

The first additional piece of network parameter data is a flag designated as the DISTRIBUTE_RESELECTION_FLAG. The DISTRIBUTE_RESELECTION_FLAG is a piece of data which indicates whether or not the improved algorithm as described below is to be implemented within a current cell. As such, the flag may have a binary value of either true or false. In other words, in embodiments of the invention, the flag may have a 0 or a 1 binary value where 1 is true and 0 is false. This DISTRIBUTE_RESELECTION_FLAG may be stored within the memory of the user equipment.

The second additional piece of network parameter data is a numerical value designated as the MAX_RESELECTION_DELAY. The MAX_RESELECTION_DELAY data value indicates in seconds a defined maximum possible delay value of the reselection process to the preferred co-located neighbour cell base station. The MAX_RESELECTION_DELAY value when received over the radio access network may also be stored in the memory of the user equipment.

In some embodiments of the invention, the network data parameters may have different designations or configurations. For example in some embodiments of the invention the DISTRIBUTE_RESELECTION_FLAG information may be found within the MAX_RESELECTION_DELAY network data parameter. In such an embodiment of the invention a MAX_RESELECTION_DELAY value of 0, would be detected to have the same effect as a DISTRIBUTE_RESELECTION_FLAG of FALSE, in other words that the waiting part of the algorithm described below is to be disabled. Similarly a MAX_RESELECTION_DELAY value greater than 0, would be detected as having the same effect as DISTRIBUTE_RESELECTION_FLAG of TRUE in other words of enabling the waiting part of the algorithm below.

Furthermore in other embodiments of the invention, the MAX_RESELECTION_DELAY value may not indicate a time period in seconds but instead define a particular number of time frames or a categorical indication to the user equipment.

With reference to FIG. 3, the operation of the improved reselection algorithm encompassing embodiments of the invention are shown in detail.

The processor in the user equipment starts the algorithm. The starting of the algorithm is shown in FIG. 3 by the step 201.

Furthermore the processor at a convenient point in time reads and stores to memory the network data parameters DISTRIBUTE_RESELECTION_FLAG and MAX_RESELECTION_DELAY values.

This reading and storing may for example be carried out by the processor during the idle mode after entering or selecting a cell by receiving in the selected cell serviced by the first node B 11a, a broadcast network parameter message. In other embodiments of the invention the network parameters may be read from a regularly broadcast message from the first node B 11a at a time other than the initial selection of the cell served by the first node B 11a.

The reading of the network parameter data values by the user equipment is shown in FIG. 3 by step 203.

At some point in time the user equipment processor initiates an idle mode cell reselection algorithm. For example, a user equipment currently camped on the first node B may wish to reselect and camp on the cell served by the second node B 11b, for example as the second node B 11b provides an improved service capability or has a better signal. The cell reselection algorithm used to determine which cell to transfer to may be any known reselection algorithm.

The starting of the reselection algorithm in the user equipment is shown in FIG. 3 by step 205.

The user equipment processor furthermore checks the value of the DISTRIBUTE_RESELECTION_FLAG data value stored in memory. The check step is shown in FIG. 3 by step 207.

If the DISTRIBUTE_RESELECTION_FLAG indicates a true value, in other words that the current cell implements an improved embodiment reselection algorithm then the process passes to the next process described as step 209 otherwise, the process passes straight to the reselection message/completion process described later as step 215.

Where the improved algorithm is in use in embodiments of the invention, as indicated by the DISTRIBUTE_RESELECTION_FLAG value being true, the processor then selects a random number value which may be designated as the variable RANDOM_NUMBER of which the value selected is between 0 and the value provided by the MAX_RESELECTION_DELAY data value.

The selection of the random number is shown in FIG. 3 by step 209.

The processor then waits for the time period defined by the random number variable RANDOM_NUMBER value.

The operation of waiting for the RANDOM_NUMBER period in seconds is shown in FIG. 3 by step 211.

Furthermore the processor resets the value of the flag in memory so that the DISTRIBUTE_RESELECTION_FLAG value is set to false. This sets the default value for reselection where no DISTRIBUTE_RESELECTION_FLAG value is passed to it by the next reselected cell.

The resetting of the flag value is shown in FIG. 3 by step 213.

Next, the processor carries out the reselection algorithm, in other words, completing the reselection algorithm in order that the current user equipment is now camped on the cell serviced by the second node B 11b. The reselection algorithm may be implemented in the manner required by the access technology and any standard or protocol related implementation requirement. This is the operation to which the processor jumps to immediately where the DISTRIBUTE_RESELECTION_FLAG value is determined to be false. In some embodiments of the invention the process of reselection involves the transmission from the apparatus of a cell change/update or location update message.

This reselection completion is shown in FIG. 3 by step 215.

Then, the processor may stop the algorithm. The stopping of the algorithm is shown in FIG. 3 by step 217.

It would be understood by the person skilled in the art that the process may in some embodiments of the invention not stop but be kept running in the background so that after every reselection, the improved algorithm returns back to step 203 where the user equipment attempts to download the values of the DISTRIBUTE_RESELECTION_FLAG and MAX_RESELECTION_DELAY data values for the newly reselected cell.

Similarly, with regards to re-registration, embodiments of the invention may implement a further improved algorithm for re-registration which may be implemented together with or separately from the improved reselection algorithm.

The improved re-registration algorithm implemented within the user equipment processor may also have an additional two network parameters in a first embodiment of the invention. The first additional network parameter with regards to re-registration is a DISTRIBUTE_RE-REGISTRATION_FLAG value. The DISTRIBUTE_RE-REGISTRATION_FLAG value is a binary true/false value which indicates to the user equipment whether or not to enable or disable the improved algorithm in the current cell.

The second additional network parameter with regards to re-registration is the MAX_RE-REGISTRATION_DELAY data value. The MAX_RE-REGISTRATION_DELAY value may define a value in seconds, minutes or fractions of seconds or minutes or may define a time period with regards to a time frame or part of a time frame. Furthermore the value may be a categorical indication to the user equipment. This indicator is used by the user equipment as a random re-registration time frame within which the time the registration needs to be initiated.

Similarly to the reselection network parameter data values, in embodiments of the invention it may be possible to implement the improved algorithm using one additional network parameter. In such an embodiment of the invention a MAX_RE-REGISTRATION_DELAY value of 0, would be detected to have the same effect as a DISTRIBUTE_RE-REGISTRATION_FLAG of FALSE, in other words that the waiting part of the algorithm described below is to be disabled. Similarly a MAX_RE-REGISTRATION_DELAY value greater than 0, would be detected as having the same effect as DISTRIBUTE_RE-REGISTRATION_FLAG of TRUE in other words of enabling the waiting part of the algorithm below.

Furthermore, with regards to FIG. 4, the operation of an algorithm by the processor of the user equipment is shown.

Firstly, the user equipment processor starts the improved re-registration algorithm.

The starting of the improved re-registration algorithm is shown in FIG. 4 by step 301.

Furthermore the user equipment processor reads and stores in the user equipment, the data values for DISTRIBUTE_RE-REGISTRATION_FLAG and MAX_RE-REGISTRATION_DELAY. The two values may be read by the user equipment, for example, when the user equipment enters a cell. Furthermore the network values may be broadcast in a network information message by a cell at regular intervals and the user equipment read the values by receiving a network information broadcast message.

The reading and storing of the network parameter values in the user equipment by the processor and in memory associated with the user equipment is shown in FIG. 4 by step 303.

The user equipment processor furthermore receives at some point in time a paging message from the first node B, for example when the user equipment is located in the node B of cell A, where the node B requests re-registration of the user equipment within the serving cell.

The receipt of the page message requesting re-registration is shown in FIG. 4 by step 305.

The processor then initialises or starts the improved re-registration algorithm. The improved re-registration algorithm may use the signalling from any known re-registration algorithm.

The starting of the re-registration algorithm is shown in FIG. 4 by step 307.

The processor furthermore checks the value of the flag of DISTRIBUTE_RE-REGISTRATION_FLAG. If the flag is true, indicating that the node B serving the current cell is capable of handling the re-registration improved algorithm then the process passes to the next step. Otherwise the processor jumps straight to the operation of generating and transmitting a re-registration message as described below as step 315.

The operation of checking the value of the flag is shown in FIG. 4 by step 309.

The processor, where the flag is true, then selects a random number which may be indicated by the value RANDOM_NUMBER_RE-REGISTRATION. The random number RANDOM_NUMBER_RE-REGISTRATION may be any value from 0 to the value provided by the MAX_RE-REGISTRATION_DELAY value. As indicated above, this delay may be indicated in seconds, minutes, frame periods, or some other categorical indication to the user equipment.

The selection of the random number is shown in FIG. 4 by step 311.

The processor then waits for the period defined by the random number value RANDOM_NUMBER_RE-REGISTRATION. As indicated above, this may indicate a specific period in terms of time in seconds, minutes, or may indicate some categorical indication by which time the user equipment is to wait for.

The waiting is shown in FIG. 4 by step 313.

The processor then generates and transmits the re-registration message, in other words, carries out the re-registration process. The check step 309 where the flag is false passes straight to this operation. The re-registration message may be any known re-registration message format and would be associated to the standard and protocol operations of the cell within which the user equipment is re-registering.

The generation and transmission of the re-registration message is shown in FIG. 4 by step 315.

The processor then stops the improved re-registration algorithm.

The stopping of the improved re-registration algorithm is shown in FIG. 4 by step 317.

In some embodiments of the invention, it is understood that the processor may run the improved algorithm continuously in the background of the user equipment. In these algorithms there would be looping of the process back to step 307 where the improved algorithm awaits a further page message.

It should be appreciated that although the preferred embodiments of the invention have been described in the context of the LTE proposals, embodiments of the present invention may be used within the framework provided by any other standard whether it has proposed or has yet to be evolved. Embodiments of the invention may also be used in scenarios where there is no standardized framework. Accordingly references to an NB should be considered to be equally applicable to a base station or a control entity.

In the above examples the delays are described as being defined as a random number or process. However it would be understood that in embodiments of the invention the delay may also be generated by using any random and/or pseudo-random process and/or value. In some embodiments of the invention the pseudo random process may be determined for example from an integer value, which increments for each re-registration or reselection operation. The delay may be chosen to be a multiple of this integer value. Where the integer value has a sufficiently large range of possible values the distribution of the delays may be such that there is a wide time distribution between the apparatus transmitting the re-registration and re-selection messages which may be considered to be a pseudo-random or a partially random process from the viewpoint of distribution of delays of the initiation of re-selection or re-registration. In other words the delay chosen would be suitable providing it generates a delay with a high degree of entropy and thus has a low probability of also being selected by a further apparatus in the cell.

Although the above examples have been described with respect to re-registration and reselection processes, it would be understood that the above delaying operations may be employed in the apparatus in any type of message that may cause a large number of apparatus to respond to a message at the same time causing similar peaks in network usage, for example response to a cell paging.

Furthermore although in the above embodiments the process is shown waiting for the prescribed period or action prior to transmitting the response message in the form of the re-registration or reselection message, it would be understood that the embodiments of the invention may cause part or all of the process of reselection or re-registration to delay for the period. Thus in some embodiments of the invention the generation of the re-selection/re-registration message may be continued but not transmitted until the delay criteria met, whereas in some embodiments the generation of the re-selection/re-registration message be paused until the delay criteria is met. In other embodiments of the invention the initiation of the re-registration/reselection operation is paused until the delay criteria is met.

In the above described embodiments various numbers have been given for various parameters and characteristics. However, these are by way of example and in different scenarios and/or as a result of the changes to standard specifications different values can be used.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor based memory devices, magnetic memory devices and systems, optical memory devices and systems, fixed memory and removable memory.

The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:
a memory configured to store one or more parameter values;
a processor configured to at least:
initiate at least one of a cell re-selection procedure and a cell re-registration procedure;
delay, responsive to a first parameter, initiation of at least one of the cell re-selection procedure and the cell re-registration procedure, wherein the delay comprises at least one of a random delay value and a pseudo-random delay value, wherein the first parameter comprises a maximum delay value and an indicator to delay initiation of the at least one of the cell-reselection procedure and the cell re-registration procedure, wherein at least one of the random delay value and the pseudo-random delay value is less than or equal to the maximum delay value; and
generate at least one of the random delay value and the pseudo-random delay value responsive to the apparatus at least one of deciding to reselect to a new cell and receiving a message requesting re-registration.

2. The apparatus as claimed in claim 1, wherein the memory is further configured to store the first parameter.

3. The apparatus as claimed in claim 1, wherein the indicator comprises a distribution flag having a value of true.

4. The apparatus as claimed in claim 1, further comprising a communications interface configured to send a message relating to at least one of the cell re-selection procedure and the cell re-registration procedure.

5. The apparatus as claimed in claim 4, wherein the message is at least one of:
a re-registration message;
a cell update message; and
a location update message.

6. The apparatus of claim 1, wherein the apparatus is configured to receive the first parameter from another device.

7. The apparatus as claimed in claim 1, wherein the other device comprises an access node comprising at least one of:
a node B;
an enhanced node B;
a base station;
a local node B; and
a wireless communication access point.

8. The apparatus as claimed in claim 1, wherein the apparatus is comprised in a user equipment.

9. A method comprising:
initiating at least one of a cell re-selection procedure and a cell re-registration procedure, using a processor;
delaying, responsive to a first parameter, initiating at least one of the cell re-selection procedure and the cell re-registration procedure, wherein the delay comprises at least one of a random delay value and a pseudo-random delay value, wherein the first parameter comprises a maximum delay value and an indicator to delay initiation of the at least one of the cell-reselection procedure and the cell re-registration procedure, wherein at least one of the random delay value and the pseudo-random delay value is less than or equal to the maximum delay value; and
generating at least one of the random and the pseudo-random delay value responsive to at least one of deciding to reselect to a new cell and receiving a message requesting re-registration.

10. The method as claimed in claim 9, further comprising storing the first parameter.

11. The method as claimed in claim 9, wherein the indicator comprises a distribution flag having a value of true.

12. The method as claimed in claim 9, further comprising sending a message relating to at least one of the cell re-selection procedure and the cell re-registration procedure.

13. The method as claimed in claim 12, wherein the message is at least one of:
a re-registration message;
a cell update message; and
a location update message.

14. The method as claimed in claim 9, further comprising receiving the first parameter from another device.

15. The method as claimed in claim 9, wherein the other device further apparatus comprises an access node comprising at least one of:
a node B;
an enhanced node B;
a base station;
a local node B; and
a wireless communication access point.

16. A non-transitory computer-readable medium encoded with instructions that, when executed by a computer, perform at least the following:
initiate at least one of a cell re-selection procedure and a cell re-registration procedure;
delay, responsive to a first parameter, initiating at least one of the cell re-selection procedure and the cell re-registration procedure, wherein the delay comprises at least one of a random delay value and a pseudo-random delay value, wherein the first parameter comprises a maximum delay value and an indicator to delay initiation of at least one of the cell-reselection procedure and the cell re-registration procedure, wherein at least one of the random delay value and the pseudo-random delay value is less than or equal to the maximum delay value; and generating at least one of the random and the pseudo-random delay value responsive to at least one of deciding to reselect to a new cell and receiving a message requesting re-registration.

17. The non-transitory computer-readable medium as claimed in claim 16, further performing storing the first parameter.

18. The non-transitory computer-readable medium as claimed in claim 16, wherein the indicator comprises a distribution flag having a value of true.

19. The non-transitory computer-readable medium as claimed in claim 16, further performing generating the random delay value and the pseudo-random delay value.

20. The non-transitory computer-readable medium as claimed in claim 16, further performing sending a message relating to at least one of the cell re-selection procedure and the cell re-registration procedure.

21. The apparatus as claimed in claim 1, wherein the first parameter is received in a broadcast message.

* * * * *